United States Patent [19]

Otani

[11] Patent Number: 4,788,827
[45] Date of Patent: Dec. 6, 1988

[54] REFRIGERATOR WITH A SYSTEM FOR RESTORING A SET TEMPERATURE AFTER POWER CUTOFF

[75] Inventor: Nobuhisa Otani, Ibaraki, Japan
[73] Assignee: Kabushiki Kaisha Toshiba, Kawasaki, Japan
[21] Appl. No.: 158,719
[22] Filed: Feb. 23, 1988
[30] Foreign Application Priority Data
  Feb. 27, 1987 [JP] Japan .................................. 62-46420
[51] Int. Cl.$^4$ .......................... F25B 49/00; G05B 9/02
[52] U.S. Cl. ........................................ 62/126; 62/130; 62/230; 340/654; 364/184
[58] Field of Search ................. 62/126, 127, 129, 130, 62/125, 230, 229; 165/11.1; 236/94; 364/184, 187; 340/654, 585

[56] References Cited

U.S. PATENT DOCUMENTS 4,381,549  4/1983  Stamp, Jr. et al. .................... 62/126
4,412,284 10/1983  Kerforne et al. ................ 364/184 X
4,502,287  3/1985  Hare et al. ............................ 62/126
4,521,847  6/1985  Ziehm et al. ......................... 364/184
4,646,528  3/1987  Marcade et al. ................... 236/94 X

FOREIGN PATENT DOCUMENTS 57-164263 10/1982 Japan .

Primary Examiner—Harry B. Tanner
Attorney, Agent, or Firm—Cushman, Darby & Cushman

[57] ABSTRACT

A system for restoring a set temperature in a refrigerator after power has been cut off. The refrigerator includes a compartment for which plural set temperatures can be selected. The refrigerator is provided with a temperature detecting device for detecting an interior temperature of the compartment, a power restoration detecting device for detecting the restoration of power after a power cutoff occurs, and a microcomputer. The microcomputer determines the appropriate set temperature when power is restored in response to receiving a temperature detection signal from the temperature detecting device. The microcomputer stores the determined set temperature and controls the temperature in the compartment in accordance therewith.

12 Claims, 3 Drawing Sheets

REFRIGERATOR WITH A SYSTEM FOR RESTORING A SET TEMPERATURE AFTER POWER CUTOFF

BACKGROUND OF THE INVENTION

1. Field of the Invention

The present invention relates, in general, to refrigerators. More particularly, the invention relates to refrigerators with a set temperature restoration system after a power cutoff.

2. Description of the Prior Art

Refrigerators are known which have compartments for which a particular set temperature can be selected. For this compartment, for example, four different set temperatures can be selected, according to what is to be stored therein. Therefore, this compartment can be used as a freezer compartment, a partial freezing compartment, a chilled compartment, or a refrigeration compartment (referred to below as F-compartment, P-compartment, C-compartment and R-compartment, respectively). When the compartment is used as an F-compartment, P-compartment, C-compartment or R-compartment, the temperature within the compartment is controlled to be about −18.5° C., −3.5° C., −1.0° C. and 3.0° C., respectively, by using a temperature sensor mounted therein. A temperature detecting circuit includes the temperature sensor for detecting the compartment temperature and plural comparators for comparing the detected temperature with the set temperature. An example of such a temperature detecting circuit is disclosed in Japanese Patent Laid-Open Publication No. 57-164263, filed on Apr. 2, 1981 in the name of Noboru Nakagawa et al. The opening and closing time of a damper is regulated based on the temperature detected by the temperature sensor, and through the damper, cold air is supplied to the compartment to keep the temperature therein at an appropriate level. A conventional refrigerator having this kind of compartment is provided with four operating switches. These four operating switches enable the select compartment to be used as a F-, P-, C- or R-compartment by switching the appropriate switch to ON. These switches have contacts which mechanically maintain the position in which they are left after manual actuation, so when these switches are set to ON, the contacts are latched mechanically in the contacting state, closing the circuit. By setting them to OFF, the latch is released and the contacts are opened. Since the contacts of these switches are latched mechanically, when power is restored after it has been cut off, temperature control of the compartment in this type of refrigerator is governed by the prior state of the contacts.

Such a latching switch is, in general, more expensive and is less reliable than the mechanical latching mechanism. Therefore, because the prior art refrigerator described above uses an operating switch with latching contacts to control the temperature set for the compartment, this prior art refrigerator has a high cost and is less reliable.

SUMMARY OF THE INVENTION

It is an object of the present invention to provide in a refrigerator having a compartment therein for which plural set temperatures can be selected and reestablished even when power is restored after it has been cut off.

To accomplish the object described above, the present invention provides a refrigerator including a temperature detecting device which monitors the temperature in the compartment. A power restoration detecting device detects when power is restored after it has been cutoff. A set temperature decision device determines the set temperature for the compartment from the temperature inside the compartment when power is restored. A memory device stores the set temperature and generates a setting signal. A temperature control device controls the interior temperature of the compartment in accordance with the setting signal.

Since after a power cutoff, the set temperature is reestablished based on the temperature inside the compartment, no power backup is needed for the memory device even though the setting switch is not mechanically latched.

BRIEF DESCRIPTION OF THE DRAWINGS

The present invention is best understood with reference to accompanying drawings in which.

DETAILED DESCRIPTION OF THE PREFERRED EMBODIMENT

Deferring to the accompanying drawings, an embodiment of the present invention will be described.

Figure 1:
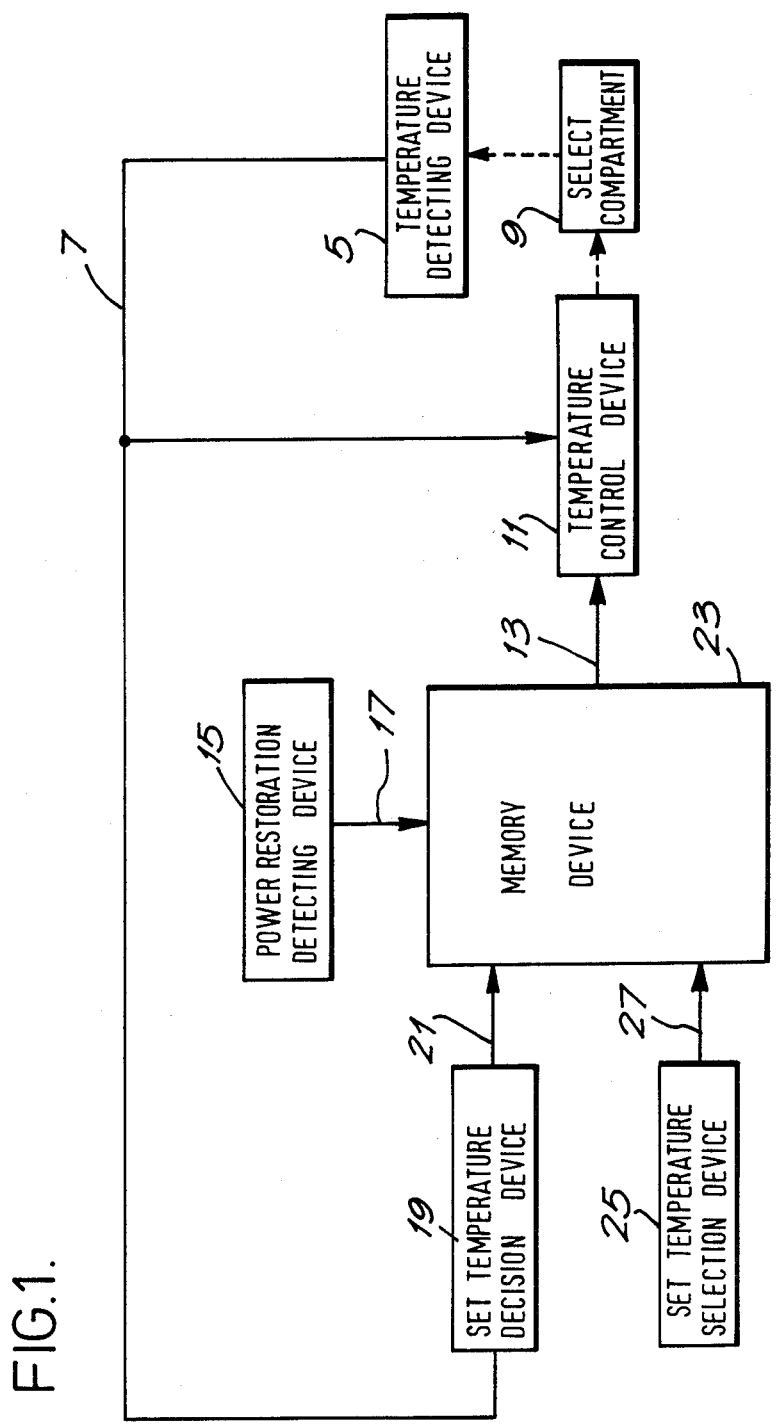
FIG. 1 is a block diagram illustrating an embodiment of the present invention.

As is shown in FIG. 1, a temperature detection device 5 outputs a temperature detection signal 7 corresponding to the temperature in a compartment 9 for which a particular set temperature can be selected. A temperature control device 11 receives the feedback provided by detection signal 7 and controls the temperature in compartment 9 in accordance with the input of a setting signal 13. A power restoration detecting device 15 detects when power is restored to the refrigerator after it has been cut off, and outputs a power restoration signal 17. A set temperature decision device 19 receives temperature detection signal 7, decides on the set temperature which is closest to the temperature in compartment 9 when power is restored, and outputs this decided set temperature in the form of a temperature decision signal 21. A memory device 23 outputs its content in the form of setting signal 13, and having received power restoration signal 17, stores temperature decision signal 21 therein. A set temperature selection device 25 outputs a temperature selection signal 27 which selects the set temperature in compartment 9 only when a selection switch (not shown) is operated, and changes the content of memory device 23 to this set temperature.

When power is not cut off, the set temperature in compartment 9 is selected using set temperature selection device 25 and temperature selection signal 27 output to memory device 23 therefrom. Memory device 23 stores temperature selection signal 27 and outputs the content stored therein to temperature control device 11 in the form of setting signal 13. Once temperature selection signal 27 is stored in memory device 23, setting signal 13 continues to be output from memory device 23 to temperature control device 11 even if temperature selection signal 27 output from set temperature selection device 25 ceases. Based on setting signal 13, temperature control device 11 controls the temperature in compartment 9 to the selected set temperature employing feedback from temperature detection device 5.

When power is cut off, the temperature in compartment 9 gradually warms, since no power exists for cooling. If the power cutoff is of short duration, this temperature change is very slight. Without a backup by means of battery, for example, the contents of memory device 23 is lost and setting signal 13 ceases to be output even if the power cut is of very short duration.

However, when power is restored after such a brief power cut, temperature detection device 5 detects the temperature in compartment 9 and outputs temperature detection signal 6. Set temperature decision device 19, receiving temperature detection signal 6 from temperature detection device 5, determines the set temperature closest to the temperature in compartment 9, and outputs temperature decision signal 21 corresponding to the determined set temperature. On detecting the restoration of power, power restoration detecting device 15 outputs power restoration signal 17. Memory device 23 receives power restoration signal 17, stores temperature decision signal 21 from set temperature decision device 19, and outputs its content as setting signal 13 to temperature control device 11, whereby setting signal 13 is reproduced as it was before power was cut off.

When a set temperature is selected using set temperature selection device 25 after power has been restored, temperature selection signal 27 is output to memory device 23. Receiving temperature selection signal 27, the content of memory device 23 is changed according to the selection, which is made to enable the set temperature in compartment 9 to be changed.

Figure 2:
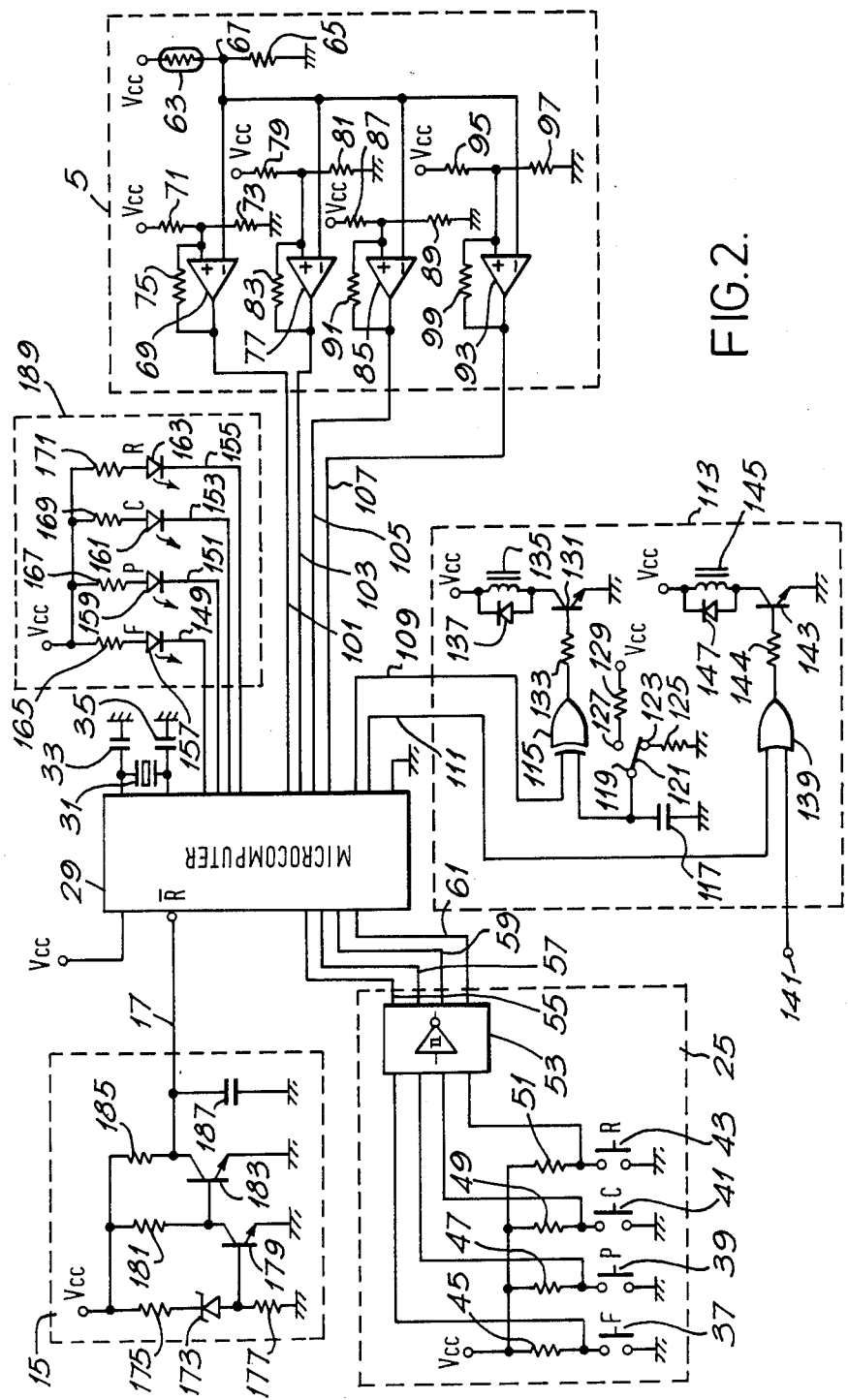
FIG. 2 is a schematic circuit diagram illustrating the embodiment of the present invention.

Referring to FIG. 2, a control circuit of this embodiment will be described as follows. A microcomputer 29 has a ceramic oscillator 31. The ends of ceramic oscillator 31 are connected to ground through capacitors 33 and 35, respectively. Microcomputer 29 is driven by a clock whose frequency is determined by ceramic oscillator 31.

Set temperature selection device 25 includes switches 37, 39, 41 and 43, which may be operated for causing compartment 9 to act as a F-, P-, C- or R-compartment, respectively. Each switch has manually operated, normally biased open contacts and is connected to ground at one terminal. The other terminals of switches 37, 39, 41 and 43 are connected to a DC power supply Vcc through resistors 45, 47, 49 and 51, respectively. The voltage at each connection point of switches 37–43 and corresponding resistor is inverted through a schmitt trigger inverter 53, and these voltages are then input to microcomputer 29 as F selection signal 55, P selection signal 57, C selection signal 59 and R selection signal 61, respectively.

Temperature detection device 5 includes a temperature sensor 63, consisting of a well known thermistor disposed in compartment 9. One end of thermistor 63 is connected to a DC power supply Vcc, while the other end is connected to ground through a resistor 65. Connection point 67 is connected to an inverting input of a comparator 69 for F detection. A non-inverting input of the comparator 69 is connected to a voltage division circuit consisting of a resistor 71 and a resistor 73, and is also connected to an output terminal of comparator 69 through a feedback resistor 75. Similarly, connection point 67 is connected to inverting inputs of comparators 77, 85 and 93 for P, C and R detection, respectively.

Non-inverting inputs of comparators 77, 85 and 93 are connected to voltage division circuits and also to output terminals of comparators 77, 85 and 93.

Comparators 69, 77, 85, 93, for F, P, C and R detection, output from their output terminals an F detection signal 101, a P detection signal 103, a C detection signal 105 and a R detection signal 107, respectively. Signals 101, 103, 105 and 107 are input to input ports of microcomputer 29. The voltage applied to the non-inverting input of each comparator corresponds to a particular set temperature of compartment 9. The set temperature TF of comparator 9 for F detection is usually set at −18.5° C. The set temperatures of the comparators 77, 85 and 93 for P, C and R detection are TP, TC and TR; these set temperatures are usually set at −3.5° C., −1.0° C. and 3.0° C., respectively.

A damper drive signal 109 and a compressor and fan drive signal 111 are output to a drive circuit 113 from microcomputer 29. Damper drive signal 109 is input into a first input terminal of an exclusive OR gate 115. A second input terminal of exclusive OR gate 115 is connected to a common terminal 119 of a motor switch 121. A first terminal 123 of motor switch 121 is connected to ground through a resistor 125, while a second terminal 127 of motor switch 121 is connected to a DC power supply Vcc through a resistor 129. Motor switch 115 interconnects common terminal 119 and second terminal 127 when the damper (not shown) is opened in order to supply cold air to compartment 9. Switch 115 connects common terminal 119 and first terminal 123 when the damper is closed. The output signal of exclusive OR gate 115 is applied to the base of an NPN transistor 131 through a resistor 133. The emitter of NPN transistor 131 is connected to ground, while the collector thereof is connected to a DC power supply Vcc through a parallel circuit consisting of a damper relay coil 135 and a diode 137. When damper relay coil 135 is excited, the damper (not shown) moves.

Compressor and fan drive signal 111 is input into a first input terminal of an OR gate 139. A second input terminal of OR gate 139 receives a temperature detection signal from a freezer compartment (not shown) at an input terminal 141. The output signal of OR gate 139 is applied to the base of an NPN transistor 143 through a resistor 145. The emitter of NPN transistor 143 is connected to ground, while the collector thereof is connected to a DC power supply Vcc through a parallel circuit consisting of a compressor and fan relay coil 145 and a diode 147. The compressor and fan (not shown) are driven when compressor and fan relay coil 145 is excited.

An F display signal 149, a P display signal 51, a C display signal 153 and a R display signal 55 are output from microcomputer 29 and are applied to the cathodes of light emitting diodes 157, 159, 61 and 163, respectively. The anodes of light emitting diodes 157, 159, 161 and 163 are connected to a DC power supply Vcc through resistors 165, 167, 69 and 171.

Power restoration detecting device 15 outputs power restoration signal 17 to a reset input port $\overline{R}$ of microcomputer 29. The cathode of a zener diode 173 is connected to a DC power supply Vcc through a resistor 175, while the anode thereof is connected to ground through a resistor 177. The anode of zener diode 173 is also connected to the base of an NPN transistor 179. The emitter of NPN transistor 179 is connected to ground, while the collector thereof is connected to a DC power supply Vcc through a resistor 181. The collector of NPN transistor 179 is also connected to the base of another NPN transistor 183, the emitter of which is connected to ground, while the collector thereof is connected to a DC power supply Vcc through a resistor 185. A capacitor 187 is connected between the collector of NPN transistor 183 and ground, and the voltage across capacitor 187 is output in the form of power restoration signal 17 to reset microcomputer 29.

When the temperature in compartment 9, which is detected by temperature sensor 63, is lower than the set temperature TF, the voltage of connection point 67 in temperature detection device 5 is lower than the voltage of the connection point of resistor 71 and resistor 73, i.e., the reference voltage, since the resistance value of temperature sensor 63 is high. Therefore, the output signal of comparator 69 for F detection, i.e., F detection signal 101, becomes a high level. When the temperature in compartment 9 is higher than the set temperature TF, the resistance value of temperature sensor 63 is lowered, whereby the voltage of connection point 67 is higher than the reference voltage, and the output signal of comparator 69 for F detection, i.e., F detection signal 101, becomes a low level. Positive feedback is supplied from the output terminal to the non-inverting input terminal of comparator 69 for F detection through feedback resistor 75 in order to provide comparator 69 with hysteresis.

The other comparators, i.e., comparator 77 for P detection, comparator 85 for C detection, and comparator 93 for R detection, operate in the same way. Their respective limits are set temperatures TP, TC and TR. When the temperature in compartment 9 exceeds these limits, the output signal of the comparator concerned becomes low level.

In set temperature selection device 25, when, for example, switch 37 is operated, the voltage of the connection point of switch 37 and resistor 45 becomes low. This voltage is inverted by schmitt trigger inverter 53, so that a high level F selection signal 55 is supplied to the input port of microcomputer 29. When switch 37 is released, the voltage of F selection signal 55 reverts to a low level. Switches 39, 41 and 43 operate in the same way.

When the damper is closed, the electric charge stored in capacitor 117 is discharged through resistor 125, and a low level signal is therefore provided to one of the input terminals of exclusive OR gate 115. If, in this situation, damper drive signal 109 from microcomputer 29 becomes a high level, the output signal of exclusive OR gate 115 becomes a high level, causing NPN transistor 131 to conduct. Damper relay coil 135 is excited and the damper is driven so that it is opened. When the damper opens, connection is made between common terminal 119 and second terminal 127 of motor switch 121, and capacitor 117 is charged through resistor 129. As the period for charging capacitor 117 is typically set at approximately two seconds, the voltage across capacitor 117 becomes a high level after a delay of approximately two seconds from the switching of motor switch 121 to its second terminal 127. As damper drive signal 109 is now a high level, the output signal of exclusive OR gate 115 becomes a low level, stopping damper drive with the damper fully open. When the compressor and fan are driven with the damper in this open state, the temperature in compartment 9 falls. When, in this open state, the damper drive signal 109 becomes a low level as the temperature in compartment 9 falls below the set temperature, for example, to TF, the output signal of exclusive OR gate 115 reverts to a high level, and the damper is driven again. As the damper closes, connection is made between common terminal 119 and first terminal 123 of motor switch 121, and the electric charge stored in capacitor 117 is rapidly discharged through resistor 125. Therefore, the voltage of one of the input terminals of exclusive OR gate 115 becomes a low level. Then, as both input terminals of exclusive OR gate 115 become a low level, the output signal of exclusive OR gate 115 becomes a low level, and the damper drive stops.

The output of OR gate 139 becomes a high level when the voltage of compressor and fan drive signal 111 from microcomputer 29 or the voltage applied to input terminal 141 in accordance with the temperature in the freezer compartment becomes a high level. When the output of OR gate 139 becomes a high level, NPN transistor 143 turns on, compressor and fan relay coil 145 is excited, and the compressor and fan are driven. When both input terminals of OR gate 139 are a low level, NPN transistor 143 turns off and the compressor and fan drive stop.

When, for example, F display signal 149 from the microcomputer 29 becomes a low level, current is supplied through resistor 165 to light emitting diode 157, and light emitting diode 157 lights up. When another light emitting diode lights up, F display signal 149 is changed to high level by microcomputer 29 and light emitting diode 157 does not light up. In other words, at any time only one of display signals 149, 151, 153 and 155 becomes low, displaying in this way the setting of the temperature in compartment 9.

After power has been provided to power restoration detecting device 15 for a period, the voltage across zener diode 173 causes it to conduct current through resistor 177. This causes a voltage drop to appear across resistor 177, with the result that NPN transistor 179 turns ON. The voltage between the base and the emitter of NPN transistor 183 is therefore low, so NPN transistor 183 turns OFF. Therefore, capacitor 187 is charged through resistor 185 by the DC power supply Vcc, and the voltage across capacitor 187 becomes a high level. Since at this point a high level power restoration signal 17 is input to the reset input port $\bar{R}$ of microcomputer 29, microcomputer 29 is not reset.

When a power cutoff does occur, if the voltage applied across zener diode 173 drops below its cutoff voltage, zener diode 173 turns OFF, and current does not flow to resistor 177. Therefore, the voltage drop across resistor 177 decreases, causing NPN transistor 179 to turn OFF. The voltage between the base and the emitter of NPN transistor 183 therefore becomes a high level, so NPN transistor 183 turns ON. Therefore, the charge stored in capacitor 187 is rapidly discharged through NPN transistor 183.

At this state, if power is restored and the voltage across zener diode 173 is great enough to cause NPN transistor 179 to turn ON again, NPN transistor 183 turns OFF, so capacitor 187 is charged again. Since the charging of capacitor 187 is controlled by a time constant determined by resistor 185 and capacitor 187, the voltage across capacitor 187 does not become a high level immediately. The voltage across capacitor 187 becomes a high level only after the delay represented by this time constant. Consequently, a low level power restoration signal 17 is input into the reset input port $\bar{R}$ of microcomputer 29 only for a fixed time from the restoration of power, so microcomputer 29 is reset.

Figure 3:
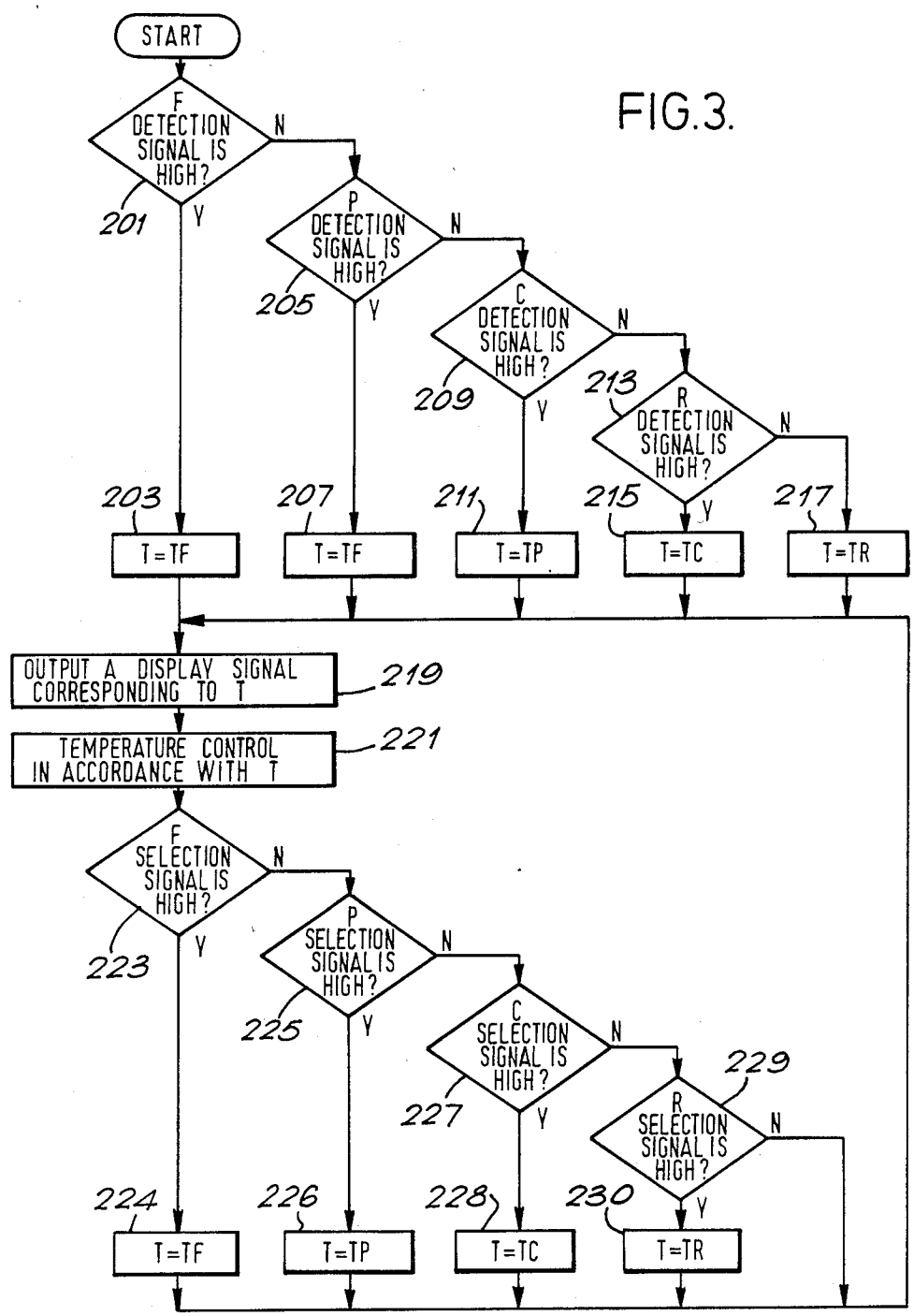
FIG. 3 is a flow chart explaining an operation of a microcomputer adopted in the schematic circuit diagram of FIG. 2.

The working of a refrigerator constituting an embodiment of the invention is explained below on the basis of FIG. 3. After the restoration of power and after microcomputer 29 has been reset by power restoration signal 17, the program described below is activated.

In step 201, the voltage level of the F detection signal 101 is ascertained. When F detection signal 101 is a high level, step 203 causes the set temperature TF to be stored at a prescribed address T in the RAM of microcomputer 29. If in step 201 the F detection signal 101 is found to be a low level, then step 205 is executed in which the voltage level of P detection signal 103 is ascertained. If this P detection signal 103 is high level, step 207 causes the set temperature TF to be stored at the address T. If in step 205 the P detection signal 103 is found to be a low level, then step 209 is executed in which the voltage level of C detection signal 105 is ascertained. If C detection signal 105 is a high level, then step 211 causes the set temperature TP to be stored at the address T. If in step 209 C detection signal 105 is found to be a low level, step 213 is executed in which the voltage level of R detection signal 107 is ascertained. If R detection signal 107 is a high level, then step 215 causes the set temperature TC to be stored at the address T. If in step 213 R detection signal 107 is found to be a low level, step 217 is executed in which the set temperature TR is stored at the address T in microcomputer 29. The set temperature stored at the address T as described above is the set temperature which is just lower than the actual temperature in compartment 9 when power is restored.

After the set temperature has been stored at address T of microcomputer 29 in this way, the program proceeds in each case to step 219. In step 219, a display signal is output corresponding to the set temperature stored at the address T. Thus, when the set temperature TF, TP, TC or TR has been stored, F display signal 149, P display signal 151, C display signal 153 or R display signal 155, respectively, is set to a low level, and the corresponding light emitting diode lights up. In step 221, the temperature in compartment 9 is controlled in accordance with the set temperature stored at the address T. For example, when the set temperature TF is stored at the address T, damper drive signal 109 and compressor fan drive signal 111 are output in accordance with the voltage level of temperature detection signal 7.

In steps 223 to 230, it is ascertained whether any of selection signals 55, 57, 59 and 61 is producing a high level selection signal, and the content of the address T is changed according to which signal is a high level. After steps 223–230, the program returns to step 219. When none of the selection signals is a high level, none of switches 37–43 is switched ON, and the program returns to step 219 without any change in the content of the address T.

The execution of this program ensures that when power is restored after a short power cutoff, the set temperature of compartment 9 is reset to the same set temperature that was in effect prior to the power cutoff. If a selection operation is performed after restoration of power using one of the selecting switches, the set temperature is altered in accordance with this selection operation.

It is also possible, by providing a backup battery for supplying DC current to microcomputer 29, to calculate the time of a power cutoff so that if this period exceeds a given length, the temperature setting of compartment 9 is always set to the C set temperature without any sensing of the temperature within compartment 9 when power is restored. In this case, the temperature setting which was in force before the power cutoff is not restored; instead, compartment 9 is used as a C compartment to prevent defrosting of the food stored therein.

As is evident from the above description, there is no need for the temperature setting of the compartment to be stored either in the set temperature selection device or in the memory device during a power cutoff, since when power is restored, the temperature setting of the compartment before the power cutoff is restored. Therefore, the construction of the set temperature selection device can be simplified and consequently made cheaper, and switches can be used which have manually operated automatic reset contacts that are less liable to fail. Also, a volatile memory without a battery backup can be used as the memory device. Furthermore, there is no need to provide an extra temperature detection device in order to restore the temperature setting, since this restoration is effected using tee temperature detection device for controlling the temperature in the compartment which is already in conventional use.

The present invention has been described with respect to a specific embodiment. However, other embodiments based on the principles of the present invention should be obvious to those of ordinary skill in the art. Such embodiments are intended to be within the scope of this invention as defined by the following claims.

What is claimed is:

1. A refrigerator including a compartment for which plural set temperatures can be selected comprising:
    temperature detecting means for detecting an interior temperature of the compartment and generating a temperature detection signal corresponding to the detected interior temperature;
    power restoration detecting means for detecting power restoration after a power cutoff has occurred and generating a power restoration signal;
    set temperature decision means for deciding, when the power restoration signal is generated upon restoration of power after a cutoff, the set temperature for the compartment based upon the temperature detection signal received from the temperature detecting means and generating a temperature decision signal indicating the set temperature decided upon;
    memory means for storing a temperature set value corresponding to the temperature decision signal and generating a setting signal corresponding to the temperature set value; and
    temperature control means for controlling the interior temperature of the compartment in accordance with the setting signal and the temperature detection signal.

2. A refrigerator according to claim 1 also including set temperature selection means for generating a temperature selection signal, said memory means also replacing said temperature set value with a new temperature set value corresponding to said temperature selection signal.

3. A refrigerator according to claim 2, wherein the set temperature selection means includes a switch having automatically reset contacts.

4. A refrigerator according to claim 2, wherein the temperature control means includes a compressor and fan driving circuit for operating a compressor and fan to generate cold air and circulate the cold air in the refrigerator, and also includes a damper driving circuit for opening a damper to supply the cold air into the compartment in response to the set temperature.

5. A refrigerator according to claim 2 also including display means for displaying the set temperature for the compartment.

6. A refrigerator according to claim 2, wherein the memory means includes a register means for storing the temperature set value, the temperature set value having one of four values, one value corresponding to the compartment being used as a freezer, one value corresponding to the compartment being used as a partial freezing compartment, one value corresponding to the compartment being used as a chilled compartment, and one value corresponding to the compartment being used as a refrigeration compartment.

7. A controller for a refrigerator including a compartment for which plural set temperatures can be selected respectively, comprising:
   temperature detecting means for detecting an interior temperature of the compartment and generating a temperature detection signal corresponding to the detected temperature;
   power restoration detecting means for detecting power restoration after a power cutoff has occurred and generating a power restoration signal;
   microcomputer means for deciding the set temperature for the compartment in accordance with the temperature detecting signal when receiving the power restoration signal and storing the set temperature decided thereby, the interior temperature of the compartment being controlled by the microcomputer means in accordance with the set temperature stored therein.

8. A refrigerator controller according to claim 7 also including set temperature selection means for generating a temperature selection signal and changing the set temperature stored in the microcomputer means in accordance with the temperature selection signal.

9. A refrigerator controller according to claim 8, wherein the set temperature selection means includes a switch having automatically reset contacts.

10. A refrigerator controller according to claim 9 also including display means for displaying the set temperature for the compartment.

11. A refrigerator controller according to claim 10 also including compressor and fan control means for operating a compressor and fan to generate and circulate cold air to be operated by the microcomputer means, and a damper driving circuit for controlling a damper to supply cold air into the compartment, the damper control means being operated by the microcomputer means to maintain the interior temperature of the compartment at one of four different temperature levels, in the first temperature level the compartment being used as a freezer, in the second temperature level the compartment being used as a partial freezing compartment, in the third temperature level the compartment being used as a chilled compartment, and in the fourth temperature level the compartment being used as a refrigeration compartment.

12. A method for restoring a set temperature in a refrigerator after power has been cut off, the refrigerator including a compartment for which plural set temperatures can be selected, comprising the steps of:
   determining when power has been restored after a power cutoff;
   detecting the interior temperature of the compartment;
   when said determining step determines that power has been restored, comparing the detected temperature in the compartment with at least one prescribed temperature and selecting a set temperature for the compartment in accordance with the comparison;
   storing the set temperature; and
   controlling the interior temperature of the compartment in accordance with the set temperature.

* * * * *